United States Patent
Miyazaki et al.

(10) Patent No.: US 10,709,965 B2
(45) Date of Patent: Jul. 14, 2020

(54) GAME DEVICE, GAMING ITEM, AND PROGRAM PRODUCT

(71) Applicant: BANDAI CO., LTD., Tokyo (JP)

(72) Inventors: Takahiro Miyazaki, Tokyo (JP); Wataru Higuchi, Tokyo (JP); Takashi Iida, Toyonaka (JP)

(73) Assignee: BANDAI CO., LTD., Tokyo (JP)

( * ) Notice: Subject to any disclaimer, the term of this patent is extended or adjusted under 35 U.S.C. 154(b) by 0 days.

(21) Appl. No.: 16/269,292

(22) Filed: Feb. 6, 2019

(65) Prior Publication Data

US 2019/0168113 A1    Jun. 6, 2019

Related U.S. Application Data

(63) Continuation of application No. PCT/JP2017/022903, filed on Jun. 21, 2017.

(30) Foreign Application Priority Data

Aug. 24, 2016    (JP) .................................. 2016-164025

(51) Int. Cl.
    *A63F 13/21*    (2014.01)
    *A63F 13/20*    (2014.01)
    (Continued)

(52) U.S. Cl.
    CPC .............. *A63F 13/20* (2014.09); *A63F 13/26* (2014.09); *A63F 13/52* (2014.09); *A63F 13/80* (2014.09)

(58) Field of Classification Search
    CPC ........ A63F 13/10; A63F 13/12; A63F 13/213; A63F 13/2145; A63F 13/23; A63F 13/25;
    (Continued)

(56) References Cited

U.S. PATENT DOCUMENTS

2003/0171142 A1    9/2003    Kaji et al.
2010/0302171 A1    12/2010    Yoshida

FOREIGN PATENT DOCUMENTS

JP    2001-036897 A    2/2001
JP    2001-276430 A    10/2001
(Continued)

OTHER PUBLICATIONS

Monster Hunter 4, Weekly Famitsu, vol. 28, No. 45, 1299-th Edition, pp. 140-141, Oct. 24, 2013.
(Continued)

*Primary Examiner* — Omkar A Deodhar
(74) *Attorney, Agent, or Firm* — Rabin & Berdo, P.C.

(57) ABSTRACT

A game device for playing a game includes a first display having a first display area, and being configured to display images for the game in the first display area, the first display area including an operation area on which a user item of a user is movably placeable, a computing device, and a storage medium containing program instructions stored therein, execution of which by the computing device causes the game device to provide the functions of: obtaining item information from the user item, the item information including a game character that is used by the user in the game, executing the game using the item information, and controlling displaying of the first display, by causing an associated image that is associated with the user item that has been movably placed on the operation area to display in the first display area.

18 Claims, 10 Drawing Sheets

(51) Int. Cl.
*A63F 13/26* (2014.01)
*A63F 13/52* (2014.01)
*A63F 13/80* (2014.01)

(58) Field of Classification Search
CPC .......... A63F 13/26; A63F 13/30; A63F 13/40; A63F 13/50; A63F 13/52; A63F 13/90; A63F 13/98
See application file for complete search history.

(56) References Cited

FOREIGN PATENT DOCUMENTS

| | | |
|---|---|---|
| JP | 2004-041740 A | 2/2004 |
| JP | 2006-251202 A | 9/2006 |
| JP | 2007-000665 A | 1/2007 |
| JP | 2007-061340 A | 3/2007 |
| JP | 2007-075140 A | 3/2007 |
| JP | 4019114 B1 | 12/2007 |
| JP | 2009-297303 A | 12/2009 |
| JP | 2011-019642 A | 2/2011 |
| JP | 2012-065817 A | 4/2012 |
| JP | 2014-176724 A | 9/2014 |
| JP | 2015-116268 A | 6/2015 |
| JP | 5925347 B1 | 5/2016 |
| JP | 6058101 B1 | 1/2017 |

OTHER PUBLICATIONS

"The new Dragon Ball Heroes series 'Super Dragon Ball Heroes' will start this fall in sequence!", Dengeki Arcade Web [online], Jun. 10, 2016, [Search Date: Sep. 7, 2017], Internet: <URL: http://dengekionline.com/elem/000/001/293/1293758>.

Kouji Fukada, "Why is a social game so addictive?", First Edition, Fifth Impression, Softbank Creative Corporation, ISBN978-4-7973-6623-5, p. 85, Feb. 20, 2012.

| CHARACTER ID | 301 |
| CHARACTER NAME | 302 |
| VARIOUS PARAMETERS | 303 |
| DISPLAY INFORMATION | 304 |

| CHARACTER ID | 311 |
| CHARACTER NAME | 312 |
| VARIOUS PARAMETERS | 313 |
| DISPLAY INFORMATION | 314 |
| DETECTED COORDINATES AND DIRECTION | 315 |
| ACTION POINTS | 316 |
| LEVEL INFORMATION | 317 | ns
GAME DEVICE, GAMING ITEM, AND PROGRAM PRODUCT

CROSS REFERENCE TO RELATED APPLICATIONS

This is a continuation application of International Application PCT/JP2017/022903 filed on Jun. 21, 2017, which claims priority from a Japanese Patent Application No. 2016-164025 filed on Aug. 24, 2016, the contents of which are incorporated herein by reference.

BACKGROUND OF THE INVENTION

Technical Field

The present invention relates to a game device, a gaming item, and a program, and in particular, relates to a game device that executes a game based on item information acquired from an item.

Background Art

In recent years, there have been game devices in which an article or item such as a card is placed on a board surface, and input operations for the game are made by moving the item on the board surface. Japanese Patent Application Laid-Open Publication No. 2004-041740 discloses a card game device in which a plurality of cards are placed on a board surface, and in which input operations are performed to change the positions within the game of characters corresponding, respectively, to the cards.

SUMMARY OF THE INVENTION

In the card game device of Japanese Patent Application Laid-Open Publication No. 2004-041740, the movement operation of the card placed on the board surface is reflected in the processes of the game, and the game screen generated as a result is displayed to the user through a display device such as a monitor, a large panel display, or the like provided behind the board surface. In other words, in order to know whether the intended movement operation for the character has been reflected in the display, the user needs to shift gaze from the board surface to the display device.

However, such a configuration would require the user to repeatedly shift gaze between the board surface and the display device, and if there is a time limit on operations to be performed on the item, or if the user is a small child or someone who is not used to playing the game, for example, then in some cases, the user cannot complete the intended operation input. Conversely, if the user focuses only on the board surface to perform the movement operation, then if a plurality of cards overlap, the card is moved outside of the detection range of the board surface, or the like, for example, then an unintended operation input might be recognized by the game device, and the game might progress with the unintended operation without the user noticing.

The present invention was made in consideration of the above problem, and an object thereof is to provide a game device, a gaming item, and a program by which it is possible to suitably convey to the user that the item has been recognized.

According to one aspect of the invention, a game device for playing a game, includes a first display having a first display area, and being configured to display images for the game in the first display area, the first display area including an operation area on which a user item of a user is movably placeable, and a computing device, and a storage medium containing program instructions stored therein, execution of which by the computing device causes the game device to provide the functions of an recognition unit configured to obtain item information from the user item, the item information including a game character of the user that the user plays in the game, an execution unit configured to execute the game using the item information, and a display controller configured to control displaying of the first display, the display controller causing an associated image to display in the first display area, the associated image being associated with the user item that has been movably placed on the operation area.

According to another aspect of the invention, a computer program product for a game device, the game device including a first display having a first display area, and being configured to display images for the game in the first display area, the first display area including an operation area on which a user item of a user is movably placeable, and a computing device to execute program instructions, the computer program product including a computer readable storage medium and the program instructions stored on the computer readable storage medium, the program instructions including program instructions to obtain item information from the user item, the item information including a game character that is used by the user in the game, program instructions to execute the game using the item information, and program instructions to control displaying of the first display, by causing an associated image to display in the first display area, the associated image being associated with the user item that has been movably placed on the operation area.

By such a configuration, according to the present invention, it is possible to suitably convey to the user that the item has been recognized.

DETAILED DESCRIPTION OF EMBODIMENTS

Embodiment

An illustrative embodiment of the present invention will be explained below in detail with reference to the drawings. In the embodiment described below, an example will be described in which the present invention is applied to a game device that can provide gameplay based on information acquired from an item as an example of a game device. However, the present invention can be applied to any device that can execute a game based on information acquired from an item.

In the present embodiment, the item, which is ejected from a game device or circulates in another form and can be used in a game, is a card, but as long as the item is configured such that item information to be described later can be acquired therefrom, the item is not limited to being a card. The item may, for example, be a molded object such as a figure having the external appearance of a game element (character or item), for example. In such a case, the item information may be acquirable from a pattern on a sticker, a printed pattern, or the like on a prescribed surface such as the bottom surface of the molded object, or from a recording medium inside the molded object. Also, the item need not be a figure, and may be any type of item such as a toy or a sticker.

Also, in the present embodiment, unchanging item information is converted to a one- or multi-dimensional pattern (code) by performing a prescribed conversion operation thereon and applied to the card by being formed (printed) on the surface of all cards that can be used in the game. The formation of codes on the card surfaces in the present embodiment is performed by printing using invisible ink.

However, implementation of the present invention is not limited thereto, and the code may be printed on the card surface in a visible manner, or a prescribed recognition pattern for the code may be formed in a middle layer of the card. Also, the item information may be changeable, and in such a case, the information may be recorded in a tag for near field communication (NFC) embedded in the card, with acquisition (recognition) and modification of the information being enabled through a prescribed reader/writer. Also, the form in which changeable item information is affixed to the card is not limited to an NFC tag, and any aspect may be used such as the information being recorded in a recording medium such as an IC chip and stored as data.

Also, during gameplay executed by the game device of the present embodiment, game elements that can appear by using the card are characters, and an image of the character (character image) is printed on the corresponding card. However, implementation of the present invention is not limited thereto, and cards for identifying game elements of a game being executed are not limited to identifying characters in the game, and such cards may naturally be enabled to identify other game elements such as items and effects.

<<Game Device 100>>

Figure 1:
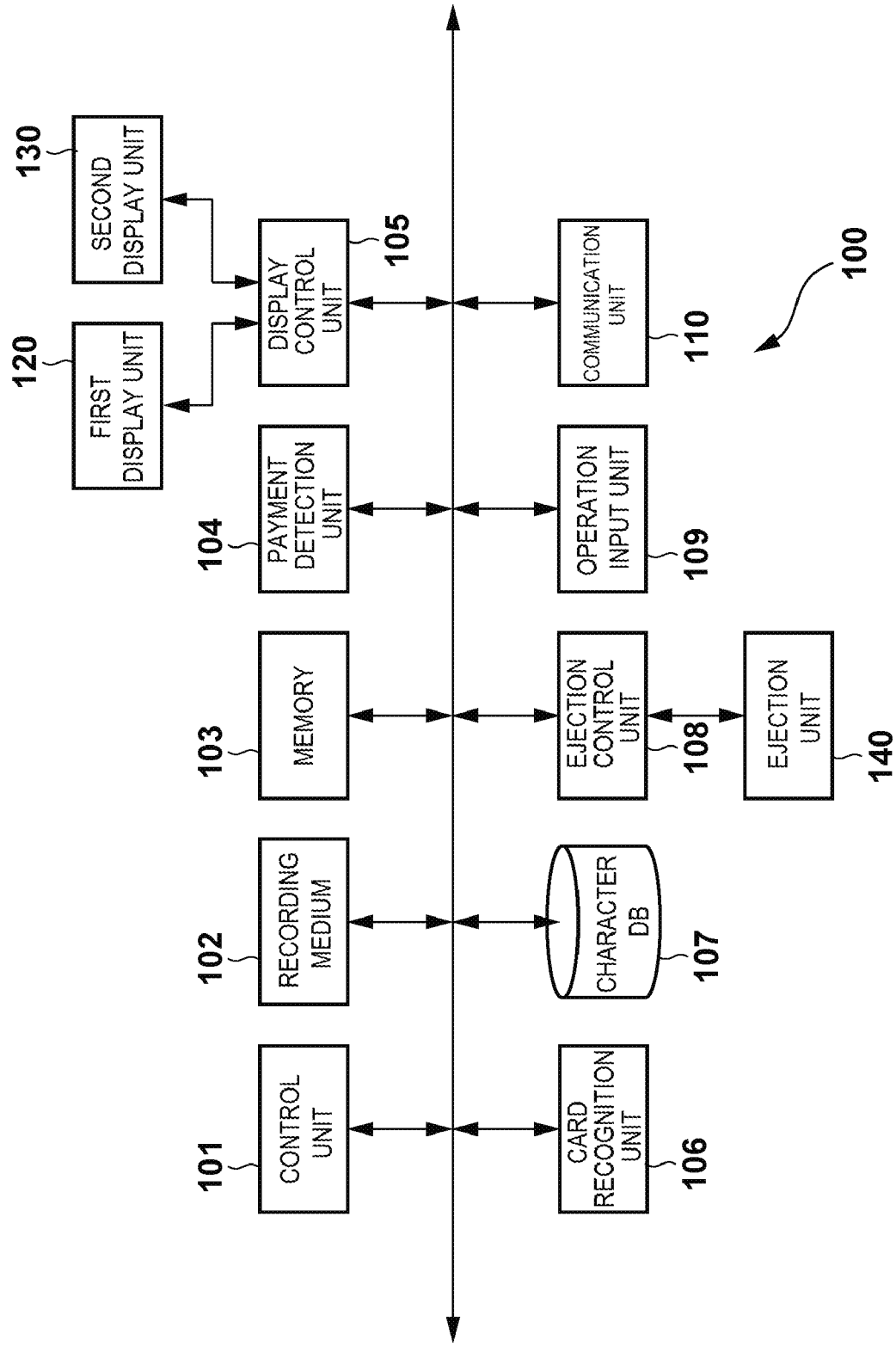
FIG. 1 is a block diagram showing a function configuration of a game device 100 according to an embodiment and a modification example of the present invention.

Here, the function configuration of the game device 100 will be described using the block diagram of FIG. 1.

A control unit (controller) 101 is a CPU, for example, and controls the operation of each block of the game device 100. Specifically, the control unit 101 reads an operation program of each block recorded in a recording medium 102 and controls the operation of each block by loading such programs in a memory 103 and executing them.

The recording medium 102 is a recording device that can permanently store data such as a non-volatile memory or an HDD, for example. The recording medium 102 stores, in addition to operation programs of the blocks in the game device 100, information such as parameters necessary for the operation of the blocks, and various graphic data used in the game executed by the game device 100. The memory 103 is a storage device used for temporary data storage such as a volatile memory, for example. The memory 103 is used not only as a loading region for loading operation programs of the blocks, but also as a storage region for temporarily storing data and the like outputted during the operation of each block.

A payment detection unit 104 detects that payment has occurred in the game device 100. Payment may be determined by detecting that cash of a prescribed amount or an equivalent value in token coins has been inserted into a cash insertion opening, that a payment process based on communication with a chip for a prescribed electronic money system has been completed, or the like. The game device 100 of the present embodiment starts providing a service resulting from the ejection of a card to a user on the basis of the payment, but payment is not a necessary condition, and the service may be started on the basis of a prescribed start command.

The display control unit 105 includes a graphic device such as a GPU, for example, and in the present embodiment performs generation and control of the screen displayed in a first display unit 120 and a second display 130. Specifically, during operation of the game device 100 (during gameplay or standby) the display control unit 105 executes an appropriate operation on a necessary object to be drawn on the basis of a process or command issued by the control unit 101, and draws the screen. The generated screen is outputted to the first display 120 and the second display 130, which are display devices that are in the same case as the game device 100 or are attached in a detachable manner to the outside of the game device 100, and the screen is shown to the user by being displayed in a prescribed display region.

Figures 2, 3A, 3B:
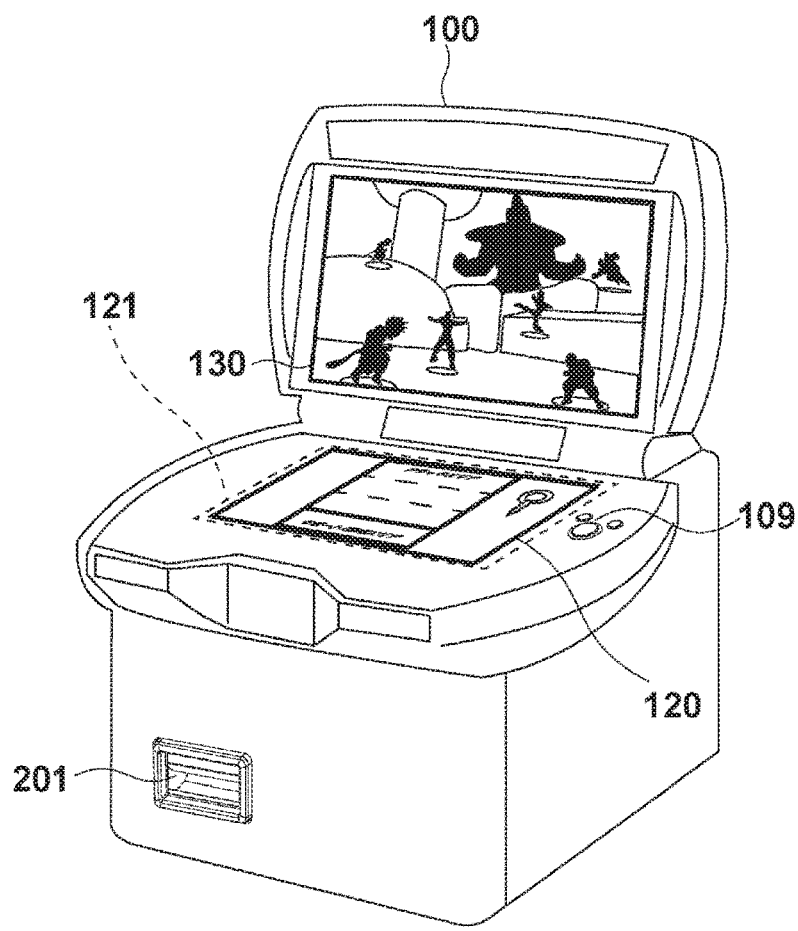
FIG. 2 shows an example of an external view of the game device 100 according to an embodiment and a modification example of the present invention.
FIGS. 3A and 3B show examples of a configuration of various data according to an embodiment and a modification example of the present invention.

The game device 100 of the present embodiment has two types of display devices (first display 120 and second display 130) that display the game screens, as shown in FIG. 2, and the display control unit 105 generates game screens in each of the display devices. As shown, in the present embodiment, the first display 120 is configured so as to have a board surface (placement panel 121) enabling placement of a card on the display region, and by the user moving the placed card at a prescribed timing, it is possible to perform some operation inputs for the game. There are a plurality of types of game screens for providing a suitable game experience displayed in the first display 120, which will be described later, and included among those types of screens is a screen that displays an image of a field to be the reference for placement of the card as shown in FIG. 2 (two-dimensional image configured so as to express the position or region in which to place the card). Meanwhile, the second display 130 in essence displays a game screen generated on the basis of a movement operation of a card performed on the board surface of the first display 120, the game screen being drawn from an overhead view of the character corresponding to the card, or the character and other characters who appear in the game, for example.

The display device according to the first display 120 of the present embodiment is configured so as to be able to recognize an invisible code affixed to the card placed on the placement panel 121. More specifically, the first display 120 is configured so as to be able to recognize and detect the position and rotation of the card placed on the placement panel 121 from the rear (inner side of case of game device 100) of the first display 120 while displaying the game screen generated by the display control unit 105. If the invisible code printed on the card is made of infrared-reflective ink, then the liquid crystal panel layer and light guide layer necessary for the placement panel 121 and display are all configured to be infrared-transmissive, and no casing is provided that serves as a shield on the bottom surface of the light guide layer. In such a case, the invisible code printed on the card placed on the placement panel 121 can be imaged by an infrared camera provided inside the game device 100.

A card recognition unit 106 acquires the item information of the card placed on the placement panel 121, identifies each placed card, and detects the position and rotation of each card. The card recognition unit 106 can simply have an infrared camera that images the first display 120 from the rear such as described above, for example, and by extracting and converting the invisible code from the image attained by imaging, the item information is acquired from the card on the placement panel 121. For simplicity, in the present embodiment, cards that can be used in the games on the game device 100 each correspond to one character that appears in each game. Thus, the item information of the card can be unchanging information formed so as to enable identification of the character provided so as to be able to appear in the game, and the item information includes information for identifying the character associated with the card in a simple manner. Thus, when the card recognition unit 106 detects from the captured image that a new card has been placed while it is able to receive placement of cards used during gameplay (captured image includes invisible code for which analysis is not complete), then by analyzing the invisible code affixed to the card, a character ID for identifying the character associated with the card is acquired. Also, the card recognition unit 106 acquires the placement position of the card from the position in the captured image where the invisible code was detected, and the position is managed, as information of the card used for game play (placement card information), in the memory 103, for example, in association with the character ID. In the configuration, the invisible code may include the predetermined direction of the card and even information for distinguishing the front and back of the card, and in analyzing the invisible code, the card recognition unit 106 detects the orientation of the card (placement direction on the board surface) and manages this as placed card information.

In the present embodiment, if a card is placed on the placement panel 121, the card recognition unit 106 acquires item information of the card and detects the position and the like, but implementation of the present embodiment is not limited to this configuration. That is, a configuration may be adopted in which the item information in the card used for gameplay is acquired by a separately provided reader, and patterns invisibly printed on the card do not include identification information of the character associated with the card but are only used for identifying the card from which the item information was acquired, for detecting movement of the card, and the like.

Also, in the present embodiment, in order to provide a suitable gaming experience, the card recognition unit 106 detects the position and direction of the card placed on the placement panel 121, but detection of the direction need not be performed depending on the form of display performed for the card in the first display 120, the shape of the placement panel 121 or the card, the configuration and format of the invisible code, or the like.

A character DB 107 is a database that manages character information for each preset character to appear in the game. As shown in FIG. 3A, for example, in association with a character ID 301 that uniquely identifies the character, a character name 302, various parameters 303 of the character in the game (values (health, attack strength, defense strength, etc.) unique to the character that determine superiority as the game progresses, various types of performance, operation conditions, etc.), and display information 304 that indicate images, model data, and the like used for displaying the character in the game screen.

An ejection control unit 108 controls ejection of the card for each round of gameplay based on payment. The card ejected by the game device 100 may be ejected prior to the start of the game sequence providing prescribed gameplay (fighting game), for example. An ejection unit 140 may be a card dispenser, for example, have a stocker (not shown) that stacks cards in the vertical direction, and have a mechanism for ejecting one card stored at the bottom of the stocker according to an ejection command issued by the ejection control unit 108. If the ejection unit 140 is installed in the same case as the game device 100, the ejected card may be provided to the user by being guided to an ejection opening 201 (FIG. 2) that can be accessed from outside the game device 100. Cards ejected from the game device 100 of the present embodiment are configured so as to have an invisible code having unique item information as described above, and thus, are ready-made cards that were printed and manufactured in advance, and all cards are formed to be the same shape and size.

An operation input unit 109 is a user interface of a game device 100 such as an operation member or various sensors for inputting decisions, for example. When the operation input unit 109 detects that an operation input on the operation member has been performed, it outputs a control signal corresponding to the operation input to the control unit 101. In the present embodiment, the operation input unit 109 detects operation inputs to various user interfaces provided in the game device 100 has physical operation members, and is a separate user interface with differing detection targets than operation inputs resulting from movement of the card detected by the card recognition unit 106. The operation input unit 109 may include a touch input detection sensor that detects touch input on the screen of the first display 120 or the second display 130, for example.

The communication unit 110 is a communication interface of the game device 100 for communication with an external device. The communication unit 110 connects to the external device through a communication medium that may be a wired or wireless connection such as a communication network including the internet or a cable (not shown), and enables transmission and reception of data. The communication unit 110 converts information inputted to be transmitted into data of a prescribed format, and transmits the data to the external device such as a server through the network. Also, when the communication unit 110 receives information from the external device through the network, it encodes the information and stores it in the memory 103. Also, the game device 100 of the present embodiment is configured so as to be able to receive, from the external device through the communication unit 110, program data in which programs for processes pertaining to the game are packaged. When the program data is received by the communication unit 110 together with an update request for the program, the control unit 101 can, according to the update request, update the program for the process pertaining to the game currently stored in the recording medium 102, using the received program data. The update process for the program for processes pertaining to the game can be executed automatically when the program recorded in the recording medium is inserted into an optical drive or the like (not shown) of the game device, or executed according to a start command by a manager after insertion.

<<Game Summary>>

Below, a game provided in the game device 100 of the present embodiment will be summarized.

The game provided in the game device 100 of the present embodiment is a fighting game that is played in rounds between a player team including the user's characters, or in other words, the characters associated with cards placed on the placement panel 121 (player character) and an opponent team including opponent characters selected by a prescribed method. In this fighting game, the player team and the opponent team are each given a team health, which is the total health set for the characters constituting each team, and the team that reduces the opponent team's health to 0 within a predetermined upper limit for the number of rounds is the winner of the game.

Each round is constituted of a strategy phase in which actions of each character of the player team in the round are determined in consideration of the states of the player team and the opponent team, and actions determined during the strategy phase are executed as the game progresses, and processes pertaining to increases and decreases in team health are performed. Here, during the strategy phase, the fighting game does not progress, and once the ending conditions for the strategy phase are satisfied and the game moves onto the action phase, the fighting game progresses in consideration of actions determined for the player team, actions determined for the opponent team, the state of the characters and teams, and the like.

In essence, the strategy phase and the action phase differ in that in the former, movement operations of cards placed on the placement panel 121 are received, whereas in the latter, movement operations of the cards placed on the placement panel 121 are not received (not necessary). In other words, in the game device 100 of the present embodiment, the period during which a movement operation by the user of cards placed on the placement panel 121 is received is limited to the strategy phase, and during the action phase, the user is not asked to perform movement operations of the cards. During the action phase, simple operation inputs on physical operation members, for example, may be received as necessary, but in order to prevent movement operations not intended by the user or increases in difficulty of gameplay, movement operations of cards on the placement panel 121 while confirming game progress in the second display 130 are made unnecessary.

Below, a specific game flow and display control will be described as an example of one aspect of a fighting game provided in the game device 100 of the present embodiment.

<Strategy Phase>

Figure 4A:
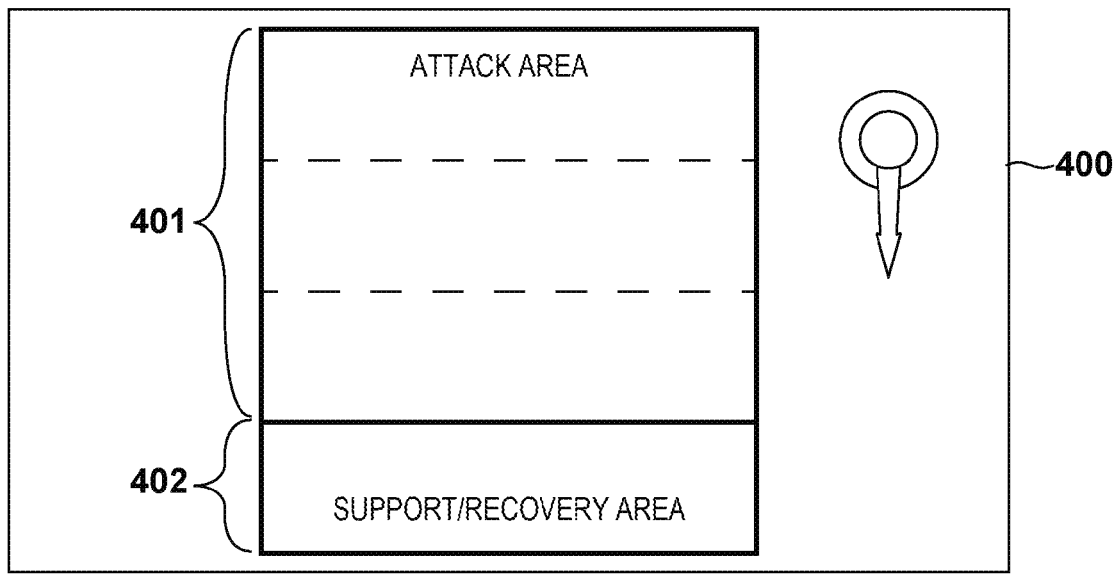
FIGS. 4A, 4B, and 4C show examples of game screens displayed in displays during a strategy phase of a fighting game according to an embodiment and a modification example of the present invention.
Figure 4B:
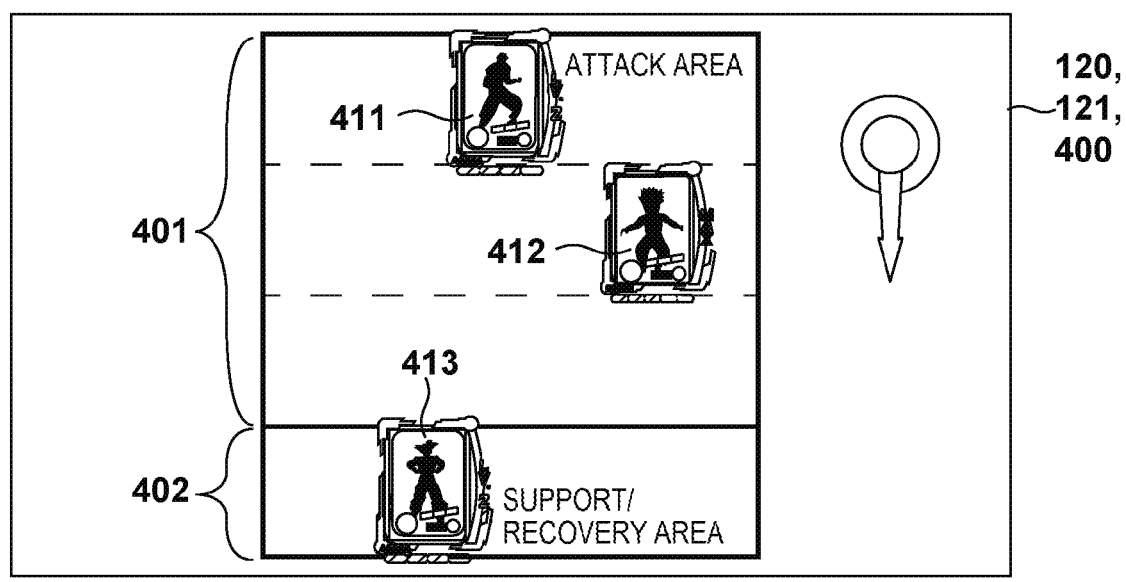
Figure 4C:
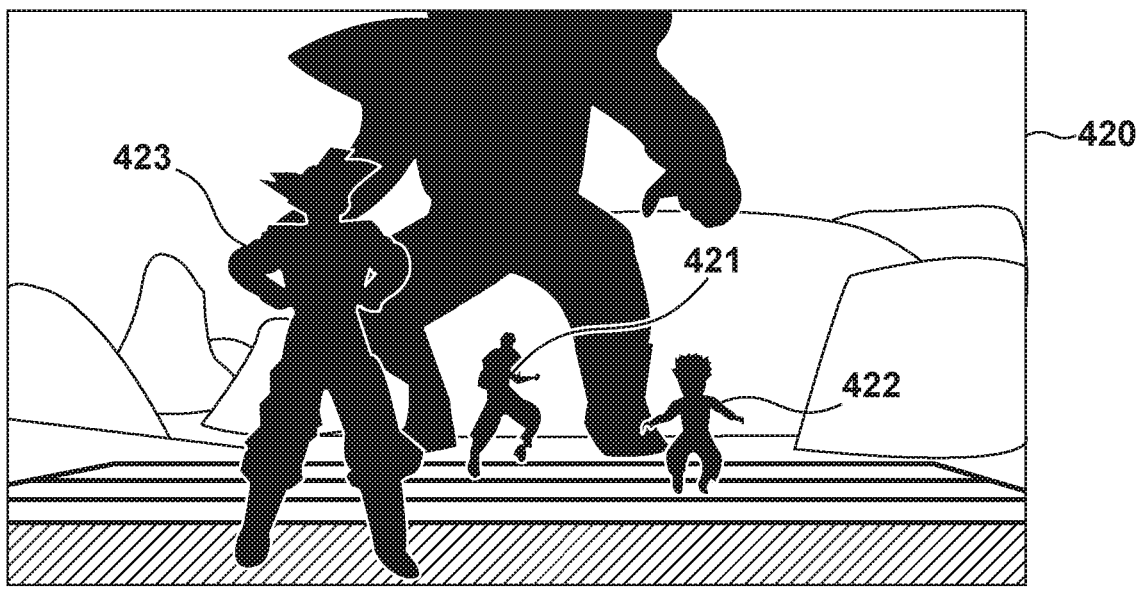

During the strategy phase, in order to set guidelines for the actions of each player character during the following action phase (same round), a game screen 400 such as that shown in FIG. 4A is displayed in the first display 120. An attack area 401 and a standby area 402 shown in the game screen 400 are regions where the player characters can be arranged in a space (3D space) in the fighting game. By the user placing cards on the placement panel 121 of the first display 120 so as to at least partially overlap the attack area 401 or the standby area 402 displayed in the first display 120, the player characters associated with the cards can be arranged in the game space. If, for example, cards 411, 412, and 413 shown in FIG. 4B are placed on the placement panel 121, then as shown in the game screen 420 displayed in the second display 130 shown in FIG. 4C, characters 421, 422, and 423 respectively corresponding to the cards are arranged while maintaining the relative positional relationship in the space of the fighting game.

The attack area 401 and the standby area 402 are areas with differing roles within the game such as actions performed during the action phase or effects applied at the end of the round for the player characters corresponding to the placed cards (overlapping the display of the areas).

The standby area 402 is for charging action points for player characters corresponding to cards placed therein without performing actions (attacks) for reducing the team health of opponent characters during the action phase. Action points are points that by being consumed during the action phase allow the character to make an attack motion. When action points are 0, the player character cannot make an attack motion, and thus, the user would need to move the card of the corresponding player character to the standby area 402. Also, the initial value of the action points, the amount of increase in the number of points by placing the card in the standby area 402, and the maximum degree to which points can be charged, for example, may be determined by various parameters 313 of the character information for each character.

Meanwhile, the attack area 401 is for player characters corresponding to cards placed therein to perform attack motions by consuming action points. As shown in FIG. 4A, the attack area 401 is divided into three regions, and the shorter the distance to the opponent team is, the greater the amount of action points consumed is, and the greater the degree to which the health of the opponent team is reduced by an attack motion. Here, the attack area 401 and the standby area 402 correspond to the space in the game determined when setting up against the opponent team in the fighting game, and are set such that the distance from the opponent team increases in the order of the attack area 401 and the standby area 402. In other words, the upper edge of the attack area 401 in FIG. 4A indicates the frontmost area in the space facing the opponent team, and the further to the back of the game device 100 (upper direction of attack area 401) the user places cards, the greater the degree to which the character corresponding to the card can reduce the opponent team health.

Thus, by the user performing movement operations on cards placed on the placement panel 121 during the strategy phase of each round, the user can determine actions to be performed and state changes to be made during the action phase of the same round, determine the arrangement of characters in the game, or the like. In the game device 100 of the present embodiment, the game screen displayed in the first display 120 is controlled such that the user can easily concentrate on movement operations of the cards during the strategy phase, or in other words, not need to repeatedly switch gaze between the second display 130 and the first display 120 in order to be able to perform intended movement operations of the cards. More specifically, in the game device 100 of the present embodiment, various information of the respective cards is displayed as the associated images of the present invention around the cards placed on the placement panel 121 as shown in FIG. 4B, and the configuration allows for the user to easily know which card movement operations to perform during the strategy phase by referring to the information. The display of various information relating to the cards (display of associated images) is set in positions determined on the basis of the placement position of the cards detected by the card recognition unit 106, and control of the display position is performed according to the movement of the cards.

Figure 5A:
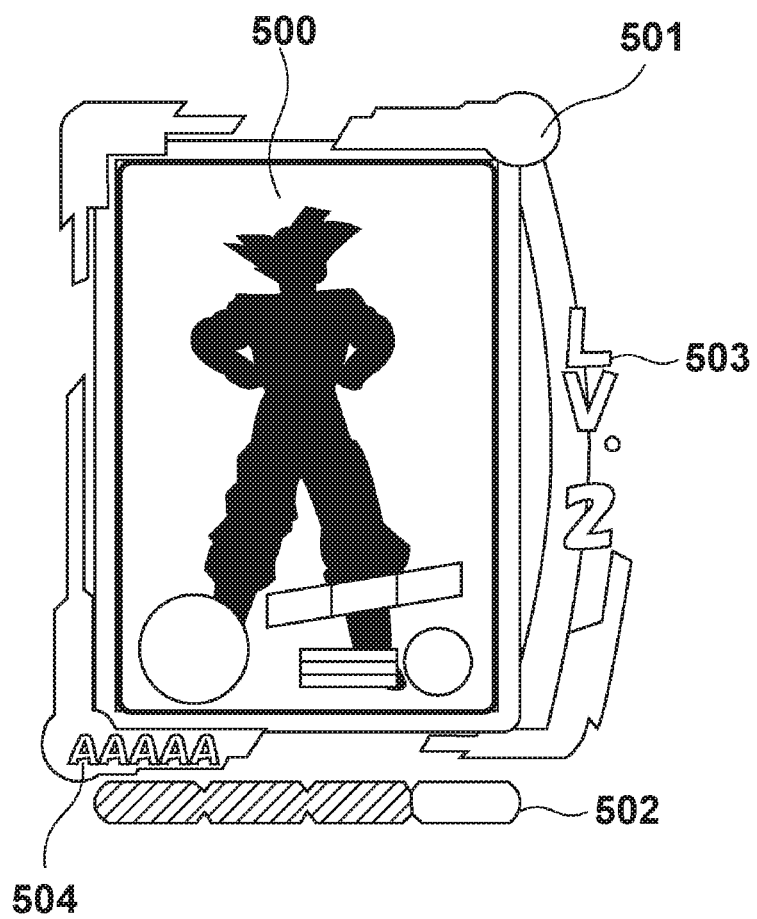
FIGS. 5A and 5B are drawings for describing associated images displayed for cards placed on a placement panel 121 during the action phase of a fighting game according to an embodiment and a modification example of the present invention.

In the present embodiment, as shown in FIG. 5A, the associated image displayed for one card 500 surrounds the placed card, and includes a frame image (first effect image) 501 that indicates that the card has been recognized, a point image 502 that indicates current action points of the player character corresponding to the card and the maximum charge value for the action points, a level image 503 indicating the level of the player character during the fighting game, and a character name 504. As described above, cards that can be used in the game in the game device 100 of the present embodiment are ready-made cards having fixed item information, and thus, if users on two game devices 100 that are connected to enable communication therebetween were to play each other in the fighting game, if the combinations of cards in use are similar, then there is a possibility that it would be difficult for a decisive winner to emerge. Thus, in the present embodiment, the concept of "levels" is introduced in which if a prescribed operation input (operation input on a physical operation member) during the action phase is successful, then the level increases, and the higher the level is, the more favorably the fighting game progresses, which enables a wide range of variation even with ready-made cards and allows for a game with a high degree of strategy.

Figure 5B:
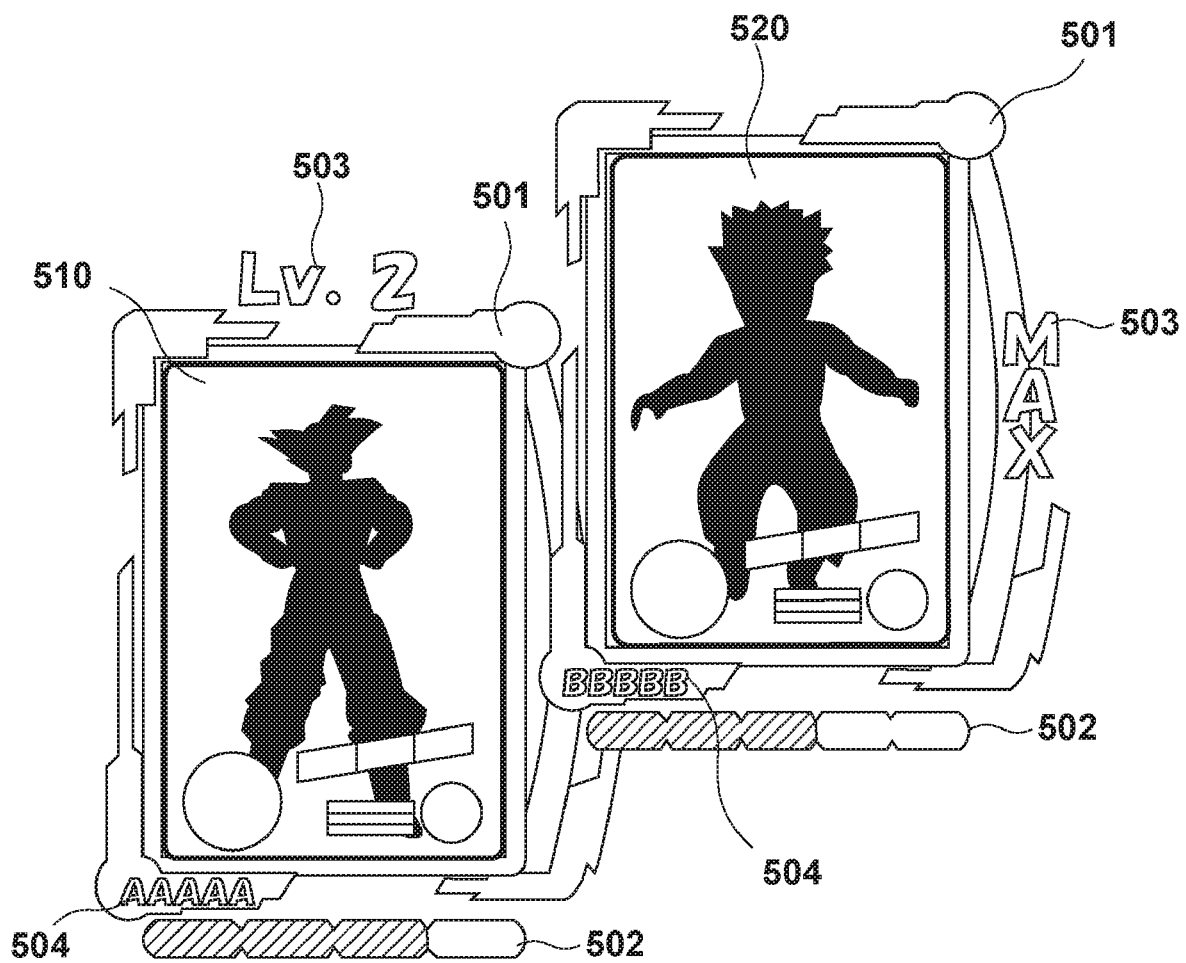

Here, the frame image 501, among the associated images displayed for the card 500, has a fixed design, since it only needs to indicate whether the card was recognized, and the frame image may be displayed so as to be centered on the placement position of the card with each of the sides of the frame tracing the outer edges of the card, for example. The character name 504 displays the character name determined on the basis of the item information (character ID) acquired for the card, and thus, the design, which is an image generated by a combination of fonts used in the game, a predesigned character string image, or the like, may also be fixed. On the other hand, the point image 502 and the level image 503 are state images indicating states, which can change depending on the content of gameplay, and thus, the designs thereof include changing elements. The display positions of the state images may be dynamically changed in regions near the cards (regions determined according to the placement positions of the cards) such that even if two cards were placed adjacent to each other as shown in FIG. 5B or cards are placed near the edge of the display region of the first display 120, for example, the current state of each player character can be seen. In the example of FIG. 5B, the level image 503 of the card 510 is moved to a position differing from the reference display position of the level image 503 shown in FIG. 5A such that the level image is not covered by the card 520.

Also, in the example of FIG. 5B, the level image 503 of the card 510 and the level image 503 of the card 520 are shown, but a configuration may be adopted in which if two cards are placed adjacent to each other, the player characters thereof are merged, and the level image after merging the player characters is displayed in a region close to at least one of the cards.

Thus, in the game device 100 of the present embodiment, all necessary information is consolidated in the first display 120 during the strategy phase during which card movement operations are necessary, and thus, the user has no need to perform a movement operation of the card on the first display 120 while alternately switching gaze between the first display 120 and the second display 130, or to perform the movement operation of the card on the first display 120 by feel while keeping the gaze on the second display 130, and the user can focus on the movement operation of the card. More specifically, in the first display 120, the frame image is displayed at a position corresponding to the placement position of the recognized card, and thus, it is possible for the user to determine whether or not the card has been correctly recognized (examples of the card not being correctly recognized, for example, include cases in which the movement operation results in the card overlapping another card and being recognized as being placed in another position, or the recognized position is slightly offset as a result of a calibration failure of the card recognition unit 106) and handle the situation. Also, if the card has been correctly recognized, then information (associated image) to be referred to in determining the strategy in playing the fighting game is displayed along with each card, and thus, it is possible to determine with ease whether to move the card to the attack area 401 or the standby area 402 during the current round, whether to move the card to a given position within the attack area, or the like, and appropriately start the movement operation.

Also, in the present embodiment, the card is placed on the first display 120 and an associated image is displayed for cards recognized by the card recognition unit 106, but implementation of the present embodiment is not limited thereto. In other words, display of associated images such as frames is not limited to a configuration of being displayed for all placed cards, and such associated images may be displayed for only cards corresponding to characters that are usable in the fighting game. For example, by not displaying associated images for cards corresponding to characters that are unusable during the fighting game or cards mistakenly placed on the placement panel 121 during the game even if such cards were detected by the card recognition unit 106, it is possible to convey to the user that such cards cannot be used to perform operation input in the game. In such a case, the user can know, by a combination of the card placed on the placement panel 121 and the display of the associated image of the card in the first display 120, that the card is functioning as an input interface for movement operations in the fighting game. Also, the associated image may include a guide display for movement operations that can be made using the card, and the fact that the card is not functioning as an interface for movement operations may be conveyed by displaying information indicating that operations cannot be made.

<Action Phase>

When the strategy phase ends (by a decision operation or time running out), the action phase of the same round is started. Characters on which actions are to be performed during the action phase are typically characters of the player team and the opponent team that are disposed in the attack area 401. The action phase is a phase for presenting attack motions to be performed on the basis of results of the movement operation of cards performed during the strategy phase, and unlike the strategy phase, does not require movement of the cards.

First, when the action phase starts, it is determined whether the player team or the opponent team performs an attack motion first. Determination of attack order may be performed by performing a prescribed operation such as adding, to a parameter (value) such as attack strength determined for each character placed in the attack area 401 of each team, a value based on action points consumed according to the position of the character in the attack area 401, to calculate the sum of the parameters of each team, for example, and determine the order based on the size relationship (the team with the larger value goes first).

In determining attack order, the characters in the attack area 401 of the first team are grouped on the basis of attack attributes, compatibility, placement position, and the like, and each group performs an attack motion. At this time, the second team is also similarly grouped, and attack targets (defending groups) of each group of the first team are determined. Below, the actions of the first team when performing an attack motion will be described, but after the first team finishes their attack motion, the first team and second team switch between the offensive side and the defensive side, respectively, and attack motions by the second team are similarly performed.

Figure 6A:
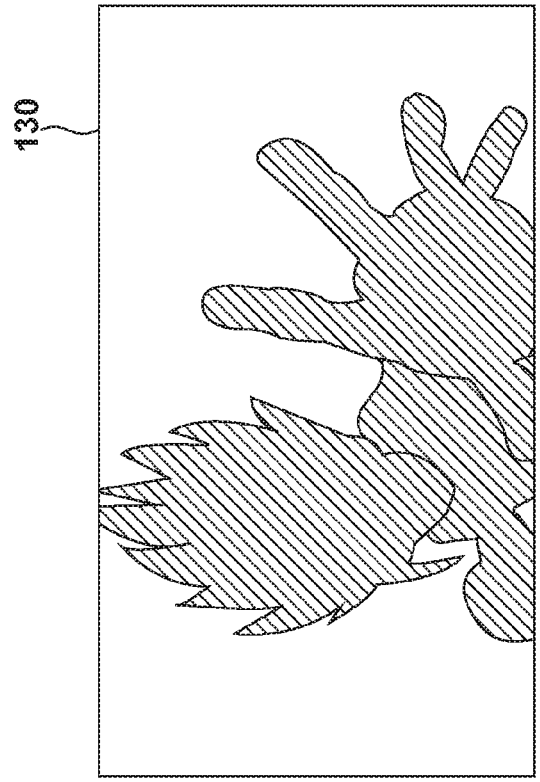
FIGS. 6A and 6B show examples of game screens displayed in displays during an action phase of a fighting game according to an embodiment and a modification example of the present invention.
Figure 6A:
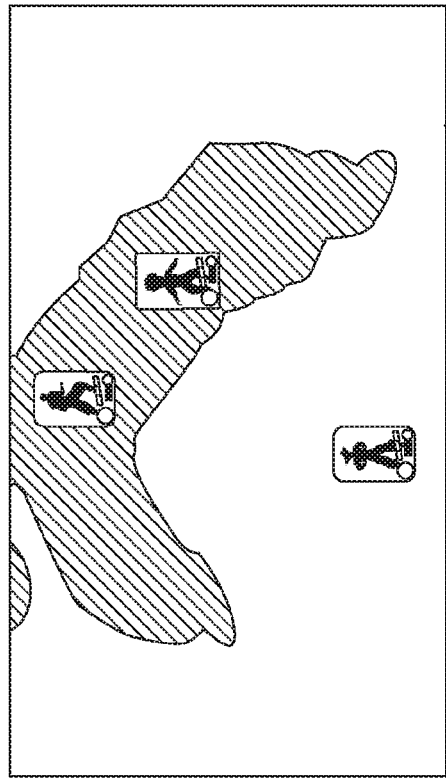

Attack motions are selected one at a time by the set groups of the first team, for example, and in each group, after a basic animation of the start of the attack is displayed, determination of the success or lack thereof of the attack motion is performed. Success or lack thereof of the attack motion is determined by the lengths of gauges provided to the attacking groups and the defending groups as shown in FIG. 6A (gauge match), for example, and if a gauge 601 of the attacking group exceeds a gauge 602 of the defending group as shown, then the attack motion is determined to have succeeded. Here, the determination of the length of each gauge is made by an operation input (operation of a physical button) according to gauge stoppage between when the length of the gauge sequentially fluctuates if the team is the player team. On the other hand, if the team is the opponent team operated by an NPC, the length of the gauge is determined by processing in which operation input according to gauge stoppage is performed at a timing determined randomly by a lottery process.

If the attack motion was determined to be successful, then the damage (amount to subtract from health) on the defending team is determined, and after display of an animation indicating a successful basic attack (that the hit was received without being blocked by the character on the defending team), the amount of damage dealt to the defending team is displayed. If the attack motion was determined to have failed, a smaller amount of damage than that of a successful attack motion is set, and after display of an animation indicating a failed basic attack (that the hit was blocked by the character on the defending team), the amount of damage dealt to the defending team is displayed. In the present embodiment, even if the attack motion failed, some damage is dealt to the defending team, though less than that of a successful attack motion, but a configuration may be adopted in which no damage is dealt from a failed attack motion.

For characters that have successive wins (successes) in gauge contests for attack motions over a plurality of rounds or actions performed during the attacking turn and defending turn of the round, such characters are leveled up to a degree depending on the number of wins. In the game provided by the game device 100 of the present embodiment, the level is used as a parameter that increases the amount of damage dealt during an executed attack motion. More specifically, in determining the amount of damage dealt by the group for which the attack motion is determined to be successful (sum of the amount of damage dealt by characters in the group), the calculated amount of damage dealt by each character in the group is increased in proportion to the level of the character. In other words, characters that have repeated successes for attack motions deal a greater amount of damage through attack motions during the action phase, thereby enabling a favorable progression of the game.

Figure 6B:
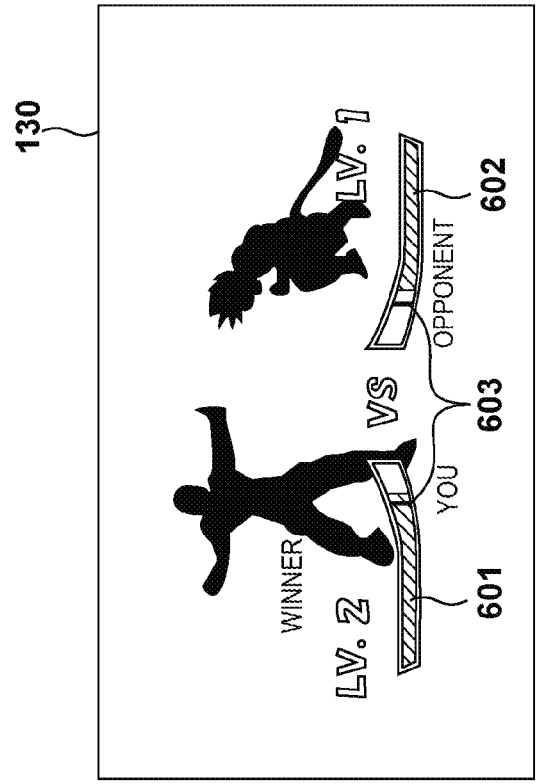
Figure 6B:
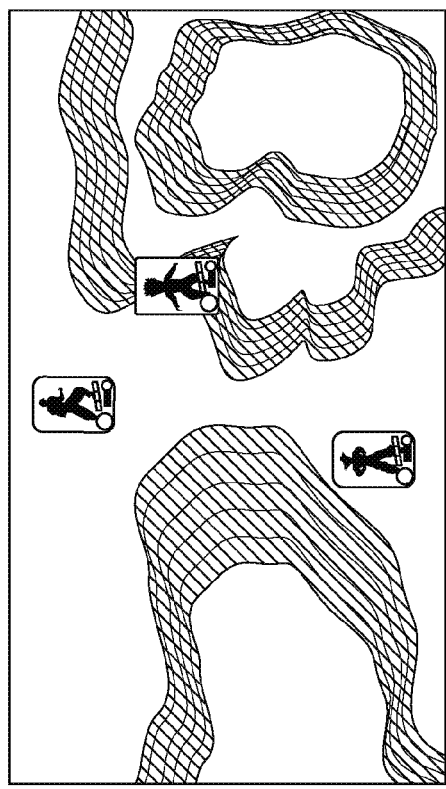

Also, in the game provided in the game device 100 of the present embodiment, if it is determined that the attack motion was successful and the length of the gauge for determining whether the attack motion is successful exceeds a threshold 603 such as shown in FIG. 6A, then a special attack motion is performed in addition to the basic attack motion. The animation for the special attack motion differs from the basic attack motion so as to engage the interest of the user and allow the user to be fully immersed in the content, and as shown in FIG. 6B, the animation is displayed by the second display 130 and the first display 120 in coordination with each other. More specifically, in generating each frame of the animation screen for the special attack motion including characters performing the special attack motion, the display control unit 105 defines two different drawing perspectives on the basis of the positional relationship between the first display 120 and the second display 130 in the game device 100, determines the drawing range for each perspective such that the displayed portions of the characters do not overlap, and draws the animation screen displayed in each display.

As can be seen from the screen displayed in the first display 120 in FIGS. 6A and 6B, during the action phase of the fighting game executed in the game device 100 of the present embodiment, the game screen of the strategy phase in which various associated images of the cards are displayed in the placement positions of the cards is not displayed in the first display 120. This is to prevent the user from mistakenly believing that it is necessary to operate the card as a result of the associated image of the card being displayed during the action phase during which operation of the card is unnecessary, or to avoid a situation in which it is difficult to focus on the second display 130 where the gauge determination operation and the like are displayed, for example. In the present embodiment, during the action phase, the attack area 401 and the standby area 402, where the character arrangement is determined, are not displayed in the first display 120, but the above-mentioned effect can be attained by performing control such that display of at least the associated images is not performed, and thus, embodiments of the present invention are not limited to such a configuration.

<<Gameplay Provision Process>>

Figure 7:
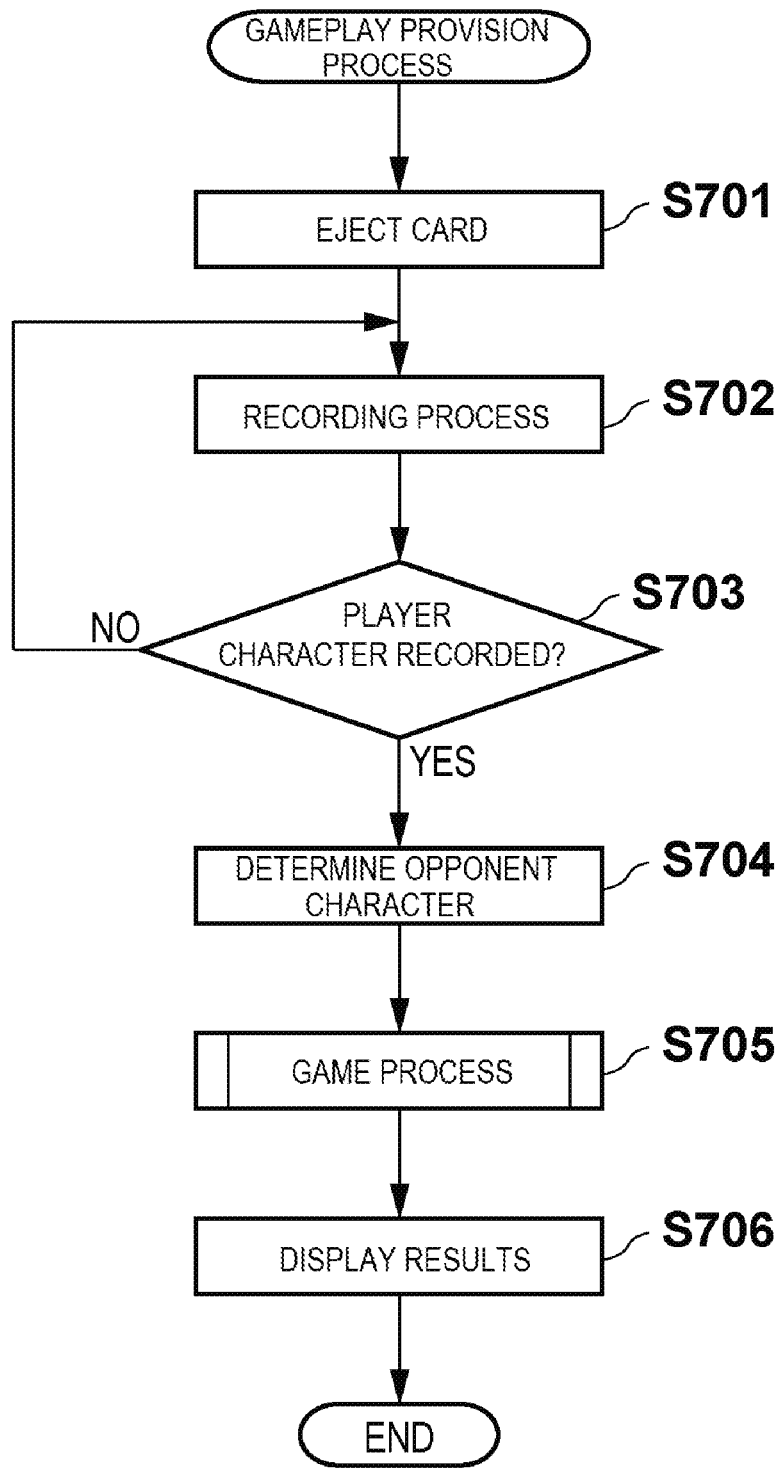
FIG. 7 is a flowchart showing an example of a gameplay provision process executed in the game device 100 according to an embodiment and a modification example of the present invention.

In the game device 100 of the present embodiment having such a configuration, the gameplay provision process executed during each round of gameplay will be described specifically with reference to the flowchart of FIG. 7. The process of the flowchart can be realized by the control unit 101 reading a corresponding processing program stored in the recording medium 102 and loading such programs in a memory 103 and executing them. The gameplay provision process is started when payment of a fee for one round of gameplay, for example, is detected by the payment detection unit 104. During execution of the gameplay provision process, unless otherwise noted, the display control unit 105 appropriately generates screens corresponding to the progression of the game and causes the screens to be displayed in the first display 120 and the second display 130 on the basis of processes and commands performed by the control unit 101.

In S701, under control of the control unit 101, the ejection control unit 108 causes the ejection unit 140 to eject a card for this round of gameplay.

In S702, the control unit 101 executes a recording process for player characters and records the player characters to be used in the fighting game. The recording process is performed by the user placing cards of characters that the user wishes to appear as part of the player team on the placement panel 121 of the first display 120. During the recording process, if there is a change in the card placed on the placement panel 121 (such as a new card being detected, or a detected card being deleted (by being removed)), a corresponding process (addition or deletion of information) is performed. If a new card is detected, for example, the card recognition unit 106 acquires the character ID (item information) of an associated character by analyzing an invisible code printed on the card, and outputs to the control unit 101 the character ID together with the detected coordinates and direction of the card. The control unit 101 acquires the character information of the card from the character DB 107 on the basis of the character ID, adds the character information to a player character management table that manages the player characters, and stores the character information in the memory 103. The information of each record managed per player character in the player character management table may have a data structure such as that shown in FIG. 3B, for example. In the example of FIG. 3B, the information managed for each player character is associated with the acquired character ID 311, and has the character name 312, the various parameters 313, the display information 314, the detected coordinates and direction 315 of the current card, and action points 316 and level information 317 that are used in displaying the associated images. At this time, no movement operation input or the like is necessary, and thus, the display control unit 105 may display a character image corresponding to the detected card in the second display 130, and enable the user to know whether or not the card has been correctly recognized.

In S703, the control unit 101 determines whether recording of the player characters has been completed. Completion of recording of the player characters may be determined according to whether an operation input by the user indicating completion of recording has been detected, or recording of the maximum number of player characters (seven) has been completed. The control unit 101 proceeds to S704 if it is determined that recording of the player characters is complete, and returns to S702 if it is determined that recording of the player characters is not yet complete.

In S704, the control unit 101 determines the opponent characters in the opponent team in the fighting game. Determination of the opponent characters may be performed by the user inputting an operation to select opponents or select a stage, by the progression of the game managed in association with identification information of the user acquired separately, according to results of a prescribed lottery process, or the like. Also, the information of the determined opponent characters may, similarly to the player characters, be recorded as one record per character in an opponent character management table stored in the memory 103. The information of each record managed for each opponent character in the opponent character management table may have a similar data structure to the information managed in the player character management table, and in such a case, the information managed as the detected coordinates and direction 315 may be determined without placement of an actual card if the opponent is an NPC.

In S705, the control unit 101 executes a game process pertaining to the fighting game in which the recorded player characters and opponent characters appear.

<Game Process>

Figure 8:
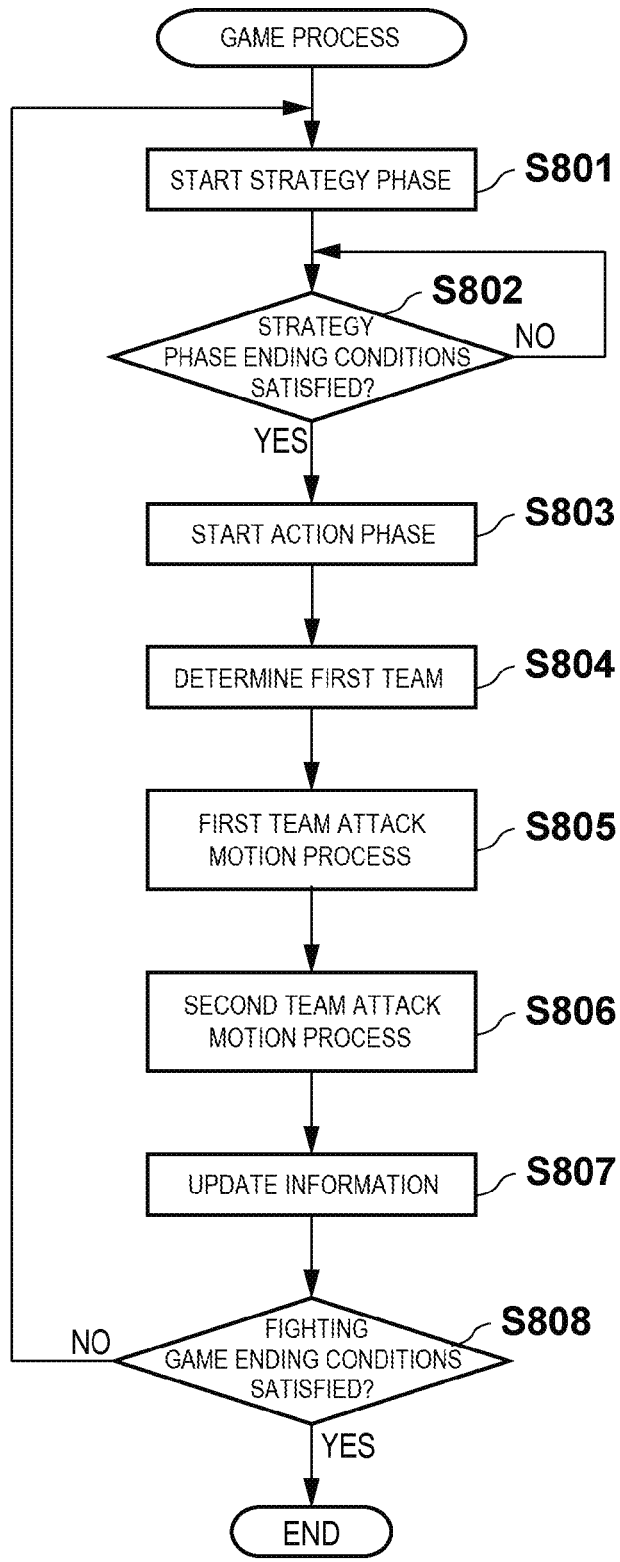
FIG. 8 is a flowchart showing an example of game process according to an embodiment and a modification example of the present invention.

Below, the game process of this step will be explained below in detail with reference to the flowchart of FIG. 8.

In S801, the control unit 101 starts the process of the strategy phase of the current round. During the strategy phase, in order to display the associated image of each card detected by the card recognition unit 106 as described above, the display control unit 105 refers to the detected coordinates and direction 315 of each player in the player character management table, and generates and updates the game screen (game screen 400 of FIG. 4A and associated images) displayed in the first display 120. During the strategy phase, when movement of a card placed on the placement panel 121 is detected, information on the detected coordinates and direction 315 of the player character management table in which each player character is managed may be sequentially updated with information associated with the card being modified, and the display control unit 105 refers to the information when the screen updates, determines the position and direction to draw the associated image and generates the game screen, and updates the display. During this time, when the player character management table is updated or at a prescribed update frequency, the display control unit 105 generates and updates the display of the game screen (game screen 420 of FIG. 4C) displayed in the second display 130 to reflect movement of the cards.

In S802, the control unit 101 determines whether conditions to end the strategy phase have been satisfied. Ending conditions of the strategy phase may be determined to have been satisfied if a decision operation to decide the arrangement of the player characters has been performed as described above, for example, or a predetermined amount of time that the user can perform operations during the strategy phase has elapsed. The control unit 101 proceeds to S803 if it is determined that ending conditions of the strategy phase have been satisfied, and repeats the process of this step if it is determined that the ending conditions have not been satisfied.

In S803, the control unit 101 starts the process of the action phase of the current round. When the action phase starts, the display control unit 105 switches the game screen displayed in the first display 120 to a screen where associated images of the cards are not displayed and an overhead view of the game field (world) of the fighting game, for example, is displayed (the display in the first display 120 in FIGS. 6A and 6B).

In S804, the control unit 101 determines whether the player team or the opponent team goes first in the action phase of the current round. The determination may be performed according to the detected coordinates and direction 315 of the cards placed so as to overlap the attack area 401 as described above, and the action points 316 to be consumed.

In S805, the control unit 101 divides the first team into groups, executes various processes including determination of success/failure of the basic attack motion for each group as well as whether or not the special attack motion is to be performed, and subtracts damage from the defending team (second team) health. In S806, the control unit 101 similarly subtracts damage from the defending team (first team) health according to attacks by the second team. During the process of S805 and S806, the display control unit 105 essentially displays the animation of the attack motion to the user by updating the display of the game screen in the second display 130. If conditions to execute the special attack motion are satisfied, the display control unit 105 defines two perspectives for drawing a non-overlapping range according to the positional relationship between the first display 120 and the second display 130 for a common object to be drawn, and generates the game screen to be displayed in the first and second displays. A configuration may naturally be adopted in which the process of S806 is only executed when the team health of the team being subjected to the action is greater than 0 (there is still health left) after the process of S805.

In S807, the control unit 101 updates the action points 316 and level information 317 of each character managed in the character management table of each team according to actions performed during the current round (including not only attack motions but movement to the standby area 402).

In S808, the control unit 101 determines whether conditions to end the fighting game have been satisfied. Ending conditions of the fighting game may be determined on the basis of whether or not the team health of either team is greater than 0, or whether or not the current round is the last round. The control unit 101 completes this game process if it is determined that ending conditions of the fighting game have been satisfied, and if the ending conditions are not satisfied, returns to S801 and performs the process of the next round.

When the game process ends, the display control unit 105 displays the results of the fighting game in the second display 130, for example, in S706 of the gameplay provision process, and then ends the gameplay provision process. By doing so, in the game device 100 of the present embodiment, associated images of the recognized items are displayed in the first display 120 having the placement panel 121 on which the items (cards) are to be placed, and thus, it is possible to suitably convey to the user that the item has at least been recognized.

<Modification Example>

In the above embodiment, an aspect was described in which the placement position of the card placed on the placement panel 121 of the first display 120 is detected when a movement operation of the card is required, an associated image including information in the game that is managed on the basis of item information acquired from the card is displayed in a position corresponding to the card, and a screen is displayed in the first display 120 to convey that the card has been recognized and is usable in the game as well as to enable various information in the game to be seen.

In a game that progresses as a result of a user operating a character, in some cases a method is adopted in which the game progression changes as a result of a prescribed effect being applied to the character. Regarding the game device 100 of the above embodiment, an example was described in which an increase in the amount of damage applied when an attack motion was successful is indicated as a "level" by the associated image, but in the present modification example, effects that can be generated for the player character are further clarified, and a game experience that involves movement operations for cards that can draw even more interest can be provided.

<<Effect Frame>>

Figure 9A:
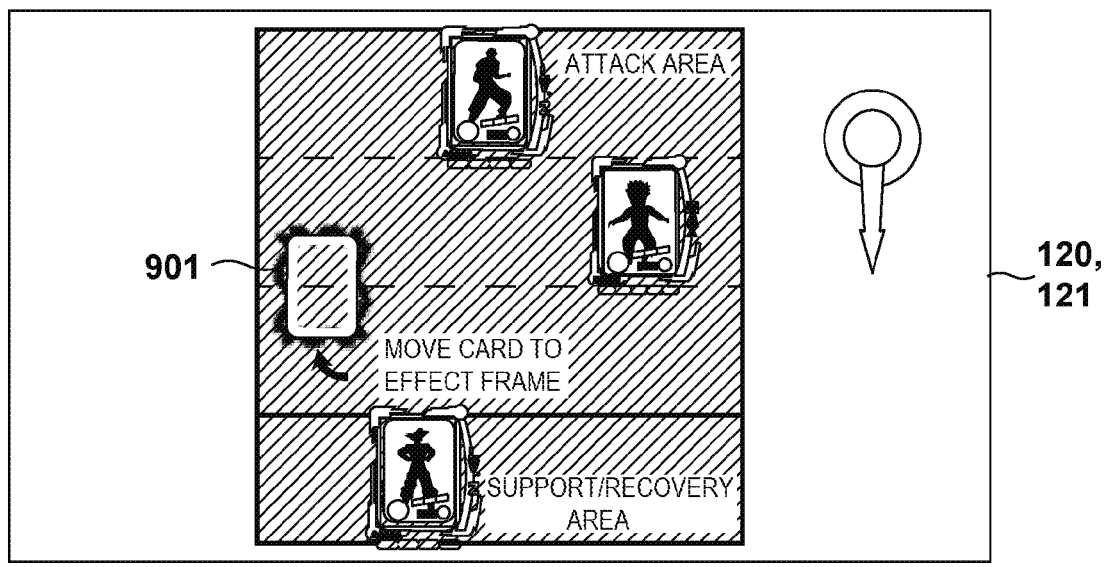
FIGS. 9A and 9B show examples of game screens displayed in a first display 120 during a strategy phase of a fighting game according to a modification example of the present invention.

A configuration may be adopted in which, during the strategy phase of the fighting game, for example, if a function to cause a prescribed effect to be applied to the character has been called, then an effect frame image (second effect image) 901 such as that shown in FIG. 9A is displayed in a prescribed position in the game screen 400, and a prescribed effect is applied to the character corresponding to the card as a result of a movement operation being performed on the card on the placement panel 121 so as to overlap the effect frame image 901. In other words, the control unit 101 may perform an adjusting process on a card that overlaps the effect frame image 901 such that various parameters 313 of the character corresponding to the card are changed to a state allowing for a favorable progression of the game.

Here, the position at which the effect frame image 901 is displayed may be a position determined in advance for the function, or may be displayed in a position that suggests an arrangement of the character that would allow for a suitable progression of the game, for example. The size of the region surrounded by the effect frame image 901 may be set to the same size and shape as the card, to convey to the user that the card should be moved so as to overlap the region. Also, forcing the user to move the card so as to completely overlap the region indicated by the effect frame image 901 would be a hassle for the user, and thus, a configuration may be adopted in which if at least a portion of the card is moved during the movement operation to a position overlapping the region where the effect frame image 901 is displayed, the effect is applied to the character. At this time, in order to enable the character on which the effect was applied to be distinguished from other characters, display control may be performed such that instead of the frame image 501, the effect frame image 901 is displayed so as to follow the position of the card while surrounding the card of the character on which the effect was applied. In other words, after the effect was applied, the effect frame image 901 is linked to the card as an associated image so as to clearly indicate the card to which the effect was applied.

The character on which the effect was applied by the effect frame image 901 may be limited to specific player characters. In such a case, a configuration may be adopted in which, if functions pertaining to display of the effect frame image 901 have been performed, then in order to make clear the card corresponding to the character on which the effect was applied by causing the effect frame image 901 to overlap the card, the game screen displayed in the first display 120 is controlled so as to display the associated image for only this card. By doing so, it can be easily conveyed to the user which card should be operated in order to apply the effect.

<<Effect Field>>

Figure 9B:
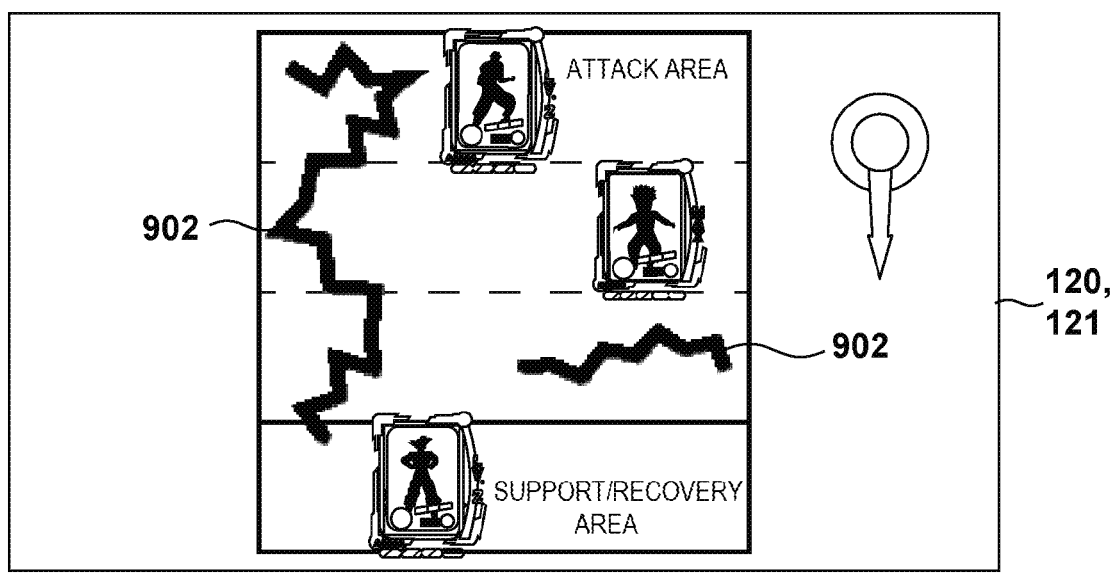

By disposing the card in the region indicated by an effect field image, the various parameters 313 of the character corresponding to the card may be changed to a state enabling favorable progression of the game, but effects to be applied to the character need not be limited thereto. For example, a configuration may be adopted in which, as a result of the action phase performed during the previous round, or as a result of actions performed during the action phase by the opponent, an effect field image (third effect image) 902 that limits movement operations for the card such as shown in FIG. 9B is displayed during the action phase of the user. If at least a portion of the card is placed in a position overlapping the region indicated by the effect field image 902, then the various parameters 313 of the character corresponding to the card may be changed to a state causing unfavorable progression of the game. The effect field image 902 need not necessarily restrict the movement operation of the card.

Other Embodiments

The present invention is not limited to the embodiments, and it is possible to make various modifications and changes without departing from the spirit and scope of the present invention. The game device of the present invention can be realized by a program in which one or more computers function as the game device. The program can be provided/distributed by being recorded in a computer-readable recording medium or through a telecommunications line.

DESCRIPTION OF REFERENCE CHARACTERS

- 100 game device
- 101 control unit
- 102 recording medium
- 103 memory
- 104 payment detection unit
- 105 display control unit
- 106 card recognition unit
- 107 character DB
- 108 ejection control unit
- 109 operation input unit
- 110 communication unit
- 120 first display
- 121 placement panel
- 130 second display
- 140 ejection unit

What is claimed is:

1. A game device for playing a game, comprising:
   a first display having a first display area, and being configured to display images for the game in the first display area, the first display area including an operation area on which a user item of a user is movably placeable;
   a computing device; and
   a storage medium containing program instructions stored therein, execution of which by the computing device causes the game device to provide the functions of:
      a recognition unit configured to obtain item information from the user item, the item information including a game character of the user that the user plays in the game;
      an execution unit configured to execute the game using the item information;
      a detection unit configured to detect a first position of the user item in the operation area, and identify the game character from the item information in the user item; and
      a display controller configured to control displaying of the first display, the display controller causing an associated image to be displayed at a second position in the first display area, and controlling the second position of the first effect image so as to change the second position in response to a change of the first position of the user item, detected by the detection unit, the associated image being associated with the user item that has been movably placed on the operation area, and including a first effect image that is displayed around the user item movably placed on the operation area, the second position being determined on the basis of the first position of the user item movably placed on the operation area.

2. The game device according to claim 1, wherein
   the display controller generates a first game image for the user to play the game, and a second game image different from the first game image, and
   the display controller,
      when the first game image is displayed, causes both the associated image and the first image to be displayed in the first display area, and
      when the second game image is displayed, causes the associated image not to be displayed in the first display area.

3. The game device according to claim 2, wherein
   the first game image is displayed when the detection unit detects a change of the first position of the user item in the operation area, and
   the second game image is displayed when the change of the first position of the user item in the operation area is not detected by the detection unit.

4. The game device according to claim 1, wherein the associated image is an image showing management information for managing the game.

5. The game device according to claim 1, wherein the second position of the first effect image of the user item corresponds to a position of the game character displayed in the first display area.

6. The game device according to claim 1, wherein the display controller controls the displaying of the associated image by a change of the first position of the user item movably placed on the operation area, so that the associated image constitutes a movement operation interface of the game.

7. The game device according to claim 1, wherein
   the associated image includes a state image indicating a state of the game character in the game, the game character corresponding to the user item movably placed on the operation area, and
   the display controller causes the state image of the game character to be displayed in a vicinity of an area in which the user item is placed.

8. The game device according to claim 7, wherein the display controller changes the state image according to the state of the game character in the game.

9. The game device according to claim 1, wherein
   the display controller causes a second effect image to be displayed at a third position in the first display area of the first display, and
   in response to detection of the first position of the user item at least partially overlapping the third position of the second effect image, the execution unit changes a state of the game character in the game.

10. The game device according to claim 9, wherein, after the user item has been moved to a position at least partially overlapping the third position of the second effect image, the display controller controls the third position of the second effect image so as to follow the first position of the user item.

11. The game device according to claim 9, wherein the second effect image has a shape surrounding an area having same shape and size as the user item.

12. The game device according to claim 9, wherein
   the user item of the user is selected from among a plurality of items,
   the plurality of items includes a first item that changes a state thereof when the first position of the user item overlaps the third position of the second effect image, and
   in response to the second effect image being displayed in the first display area, the display controller causes the associated image to be displayed in the first display area, when the user item is the first item.

13. The game device according to claim 1, wherein
the display controller further causes a third effect image to be displayed in the first display area of the first display, the third effect image having a prescribed effect in the game,
the game has a plurality of settings, including a setting for setting a level of difficulty of the game, and
in response to the first position of the user item being moved to a position that at least partially overlaps a position of the third effect image, the execution unit changes one of the plurality of settings.

14. The game device according to claim 1, further comprising a second display differing from the first display, wherein
the display controller causes the second display to be displayed the game image where the game character corresponding to the user item appears in a position corresponding to the first position of the user item movably placed on the operation area.

15. The game device according to claim 14, wherein, if the associated image is not to be displayed in the first display, the display controller determines two portions of the game character that do not overlap each other, and causes the two portions to display in the first display area and the second display area, respectively.

16. The game device according to claim 1, wherein the recognition unit obtains the item information from the user item in response to the user item being movably placed on the operation area.

17. A gaming item, comprising:
item information to be obtained by the recognition unit of the game device according to claim 1,
wherein the item information includes control information for controlling the display controller for displaying the associated image.

18. A computer program product for a game, the game device including a first display having a first display area, and being configured to display images for the game in the first display area, the first display area including an operation area on which a user item of a user is movably placeable, and a computing device to execute program instructions, the computer program product comprising:
a non-transitory computer readable storage medium and the program instructions stored on the non-transitory computer readable storage medium, the program instructions comprising:
program instructions to obtain item information from the user item, the item information including a game character that is used by the user in the game;
program instructions to execute the game using the item information;
program instructions to detect a first position of the user item in the operation area, and identify the game character from the item information in the user item, and
program instructions to control displaying of the first display, by causing an associated image to be displayed at a second position in the first display area, and controlling the second position of the first effect image so as to change in response to a change of the first position of the user item, detected by the detection unit, the associated image being associated with the user item that has been movably placed on the operation area, and including a first effect image that is displayed around the user item movably placed on the operation area, the second position being determined on the basis of the first position of the user item movably placed on the operation area.

* * * * *